(12) United States Patent
Alguera Gallego et al.

(10) Patent No.: US 6,592,140 B1
(45) Date of Patent: Jul. 15, 2003

(54) SLIDING DEVICE FOR A FIFTH WHEEL

(75) Inventors: José Manuel Alguera Gallego, Aschaffenburg (DE); Rainer Spitz, Elthille (DE)

(73) Assignee: Jost-Werke GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 10/070,895

(22) PCT Filed: Aug. 25, 2000

(86) PCT No.: PCT/EP00/08304

§ 371 (c)(1),
(2), (4) Date: Mar. 12, 2002

(87) PCT Pub. No.: WO01/21469

PCT Pub. Date: Mar. 29, 2001

(30) Foreign Application Priority Data

Sep. 17, 1999 (DE) .......................... 199 44 684

(51) Int. Cl.$^7$ .............................. B62D 53/08
(52) U.S. Cl. ....................................... 280/441
(58) Field of Search .............................. 280/441, 441.1, 280/433, 438.1

(56) References Cited

U.S. PATENT DOCUMENTS

| 4,697,844 A | 10/1987 | Giles | |
| 4,762,334 A | * 8/1988 | Altherr | 280/433 |
| 5,344,173 A | 9/1994 | Beeler et al. | |
| 5,368,324 A | * 11/1994 | Kaim | 280/438.1 |
| 6,488,305 B2 | * 12/2002 | Laarman | 280/438.1 |

FOREIGN PATENT DOCUMENTS

| DE | 1 780 488 | 1/1972 |
| EP | 0 018 790 | 11/1980 |
| EP | 0 503 954 | 9/1992 |

* cited by examiner

Primary Examiner—Kevin Hurley
(74) Attorney, Agent, or Firm—Hudak, Shunk & Farine, Co. LPA

(57) ABSTRACT

The invention relates to a sliding device for a fifth wheel. The aim of the invention is to reduce the overall weight of the system consisting of vehicle frame/slide system and also to simplify its assembly. To this end, the base frame is provided with two longitudinally extending angular profiles that are linked with each other by means of two detachable and slidably mounted tie-bars. Every angular profile comprises retaining means that interact with second retaining means of the upper part in such a manner that the upper part can be displaced relative to the base frame in the longitudinal and the transverse direction. The invention device does not require an auxiliary frame that is conventionally used.

9 Claims, 3 Drawing Sheets

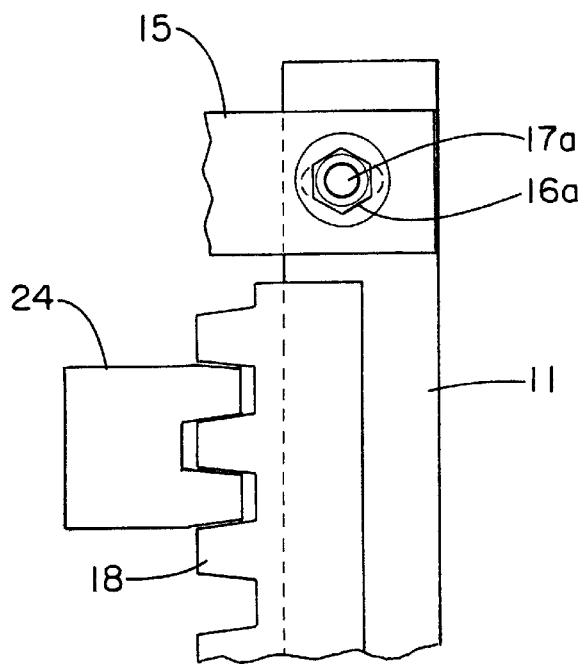
FIG.-2
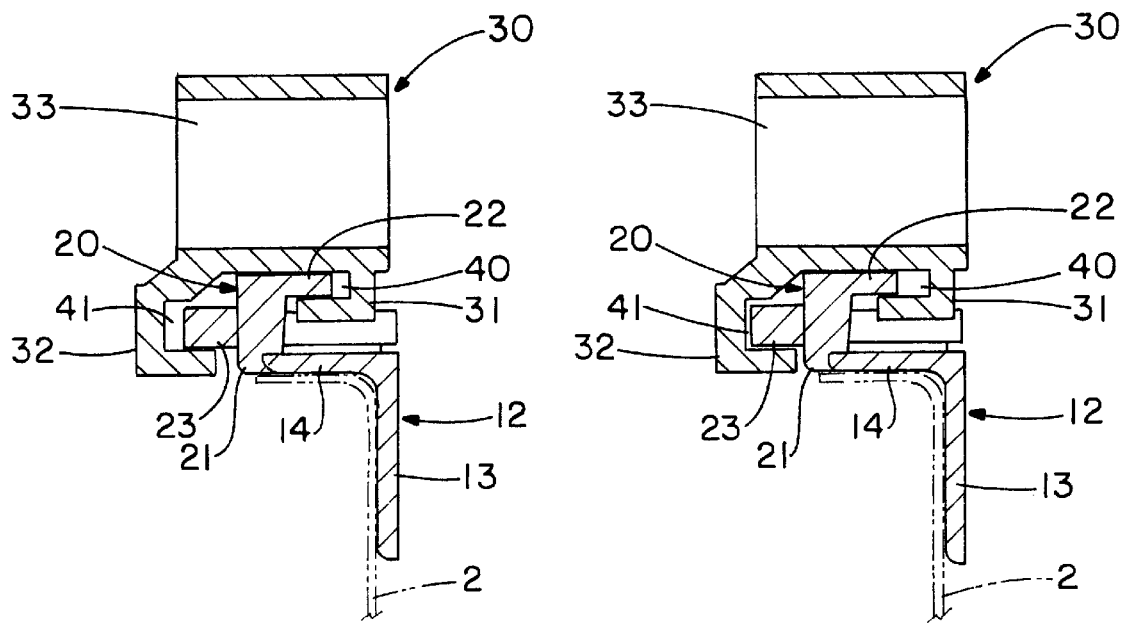
FIG.-3a (section A-A)   FIG.-3b (section A-A)

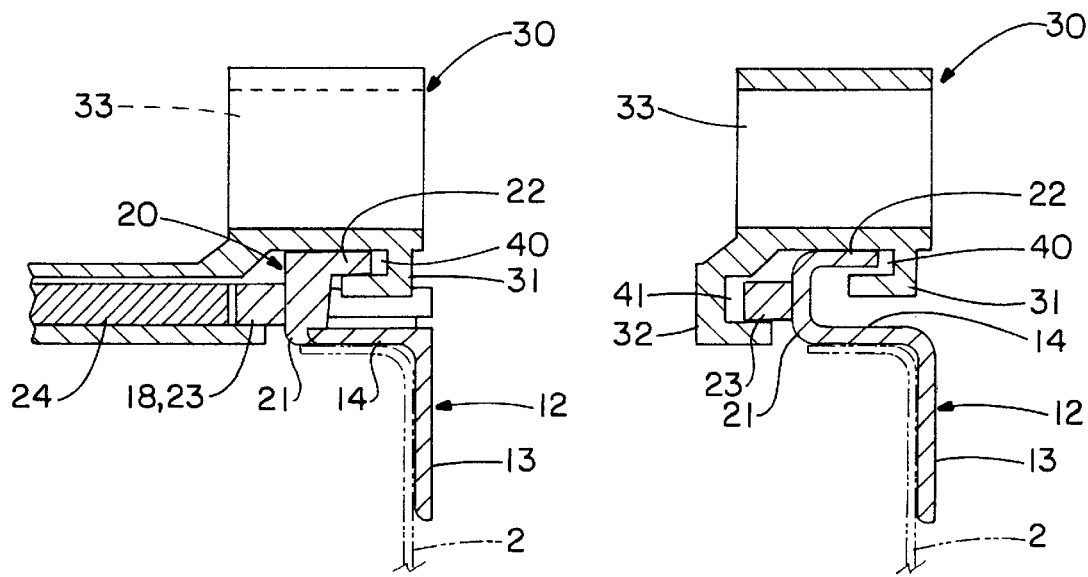
FIG.-3c (section B-B)
FIG.-4 (section A-A)

SLIDING DEVICE FOR A FIFTH WHEEL

FIELD OF THE INVENTION

The invention relates to a sliding device for a fifth wheel with an upper part bearing the fifth wheel and with a base frame arranged under the upper part.

BACKGROUND OF THE INVENTION

Sliding units are devices that bear the fifth wheel and make it possible to slide the fifth wheel longitudinally to the vehicle and lock it in various positions. Such sliding units are known from DE-AS 17 80 488 or EP 0 503 954 A1.

Semi-trailer trucks, as a rule, have framework constructions consisting of two C-profiles open toward the inside, which are linked with cross members. Fastened to this main frame, as a rule, are two auxiliary frames, to which, in turn, assembly components such as sliding units can be fastened. The sliding units mostly feature flat-shaped base frames, which are either screwed or welded to the auxiliary frame.

Thus, the overall system consists of three units: the fifth wheel, the sliding unit and the auxiliary frame. First, the auxiliary frame is screwed onto the main frame by the manufacturer of the semi-trailer truck, then the sliding unit is fastened, with the fifth wheel mounted on it, to the auxiliary frame.

The overall frame assembly of the vehicle is subject to certain variations in its overall dimensions, in particular its width, which are caused by unavoidable measurement tolerances, as well as intended variations in material strengths in the components used.

SUMMARY OF THE INVENTION

The problem of this invention consists of simplifying assembly by means of an improved sliding device which takes these measurement tolerances and, at the same time, the overall weight of the vehicle frame system/sliding system into account.

This problem is solved by a sliding device, whose base frame comprises two longitudinally extending angular profiles, which are linked with each other by means of two detachable and slideably mounted tie-bars and with which each angular profile has initial retaining means, which interact with second retaining means of the upper part in such a manner that the upper part can be longitudinally and transversally displaced relative to the base frame.

The longitudinal and transverse directions are relative to the longitudinal and/or transverse axle of the vehicle.

Since the base frame has angular profiles, it can be directly fastened to the main frame of the semi-trailer truck without any additional auxiliary frame. Tolerances concerning the distance from both frames of the semi-trailer truck can be compensated by arranging the tie-bars to be slideable. By preference this is achieved by providing the tie-bars with longitudinal holes, so as to allow adjustments to be made to various frame widths.

Since the weight of the auxiliary frame is completely eliminated, the overall weight of the vehicle frame-plus sliding device-system is significantly reduced. The vehicle auxiliary frame can be dispensed with, since the base frame that is the object of this invention assumes its function, thus also simplifying assembly. In so doing, neither the technological requirements (equipment) on the final flow line nor the semi-trailer truck manufacturer's structural designs of the main frame are altered.

The upper parts of the sliding device are rigid, as a rule, so that no adjustments to varying frame widths of the semi-trailer truck are possible. If the vehicle width changes, then the width of the base frame is adjusted by shifting the tie-bar. A rigid upper part requires relative slideability between the upper part and the base frame. To make this possible, each angular profile comprises initial retaining means, which interact with the second retaining means of the upper part in such a manner as to allow the upper part to slide, not only in the vehicle longitudinal direction, but also in a transverse direction, to adjust to the various widths ultimately predetermined by the frame construction of the semi-trailer truck.

This is achieved by means of a preferred embodiment involving the arrangement of a runner on the angular profile, which comprises an upwardly projecting leg body with one leg pointing inward and one pointing outward. In the simplest case a T-runner can be used, however, as per another embodiment, there is also the possibility of arranging both legs in a vertical direction.

The second retaining means, which are arranged on the underside of the upper part, consist of C-frames enclosing this leg. Here the C-frames and legs are coordinated in such a way as to provide gaps in a horizontal direction between the legs and the C-frames, to permit transverse sliding. So doing, the C-frames enclose the legs to the extent where the upper part may be slid inward or outward without the C-frames coming into contact with the legs.

As per another embodiment, the inside or outside leg may form a catch ledge. The upper part is equipped with one or more blocking pieces that catch on the catch ledge of the upper part at the appropriate position and thus fix the upper part.

By preference, the angular profile, the runner body and one of the two legs make up a one-piece assembly. This will further simplify manufacturing.

BRIEF DESCRIPTION OF THE DRAWINGS

Exemplary embodiments of the invention are described in further detail below, with reference to the drawings.

The following drawings are shown.

DETAILED DESCRIPTION OF THE INVENTION

Figure 1:
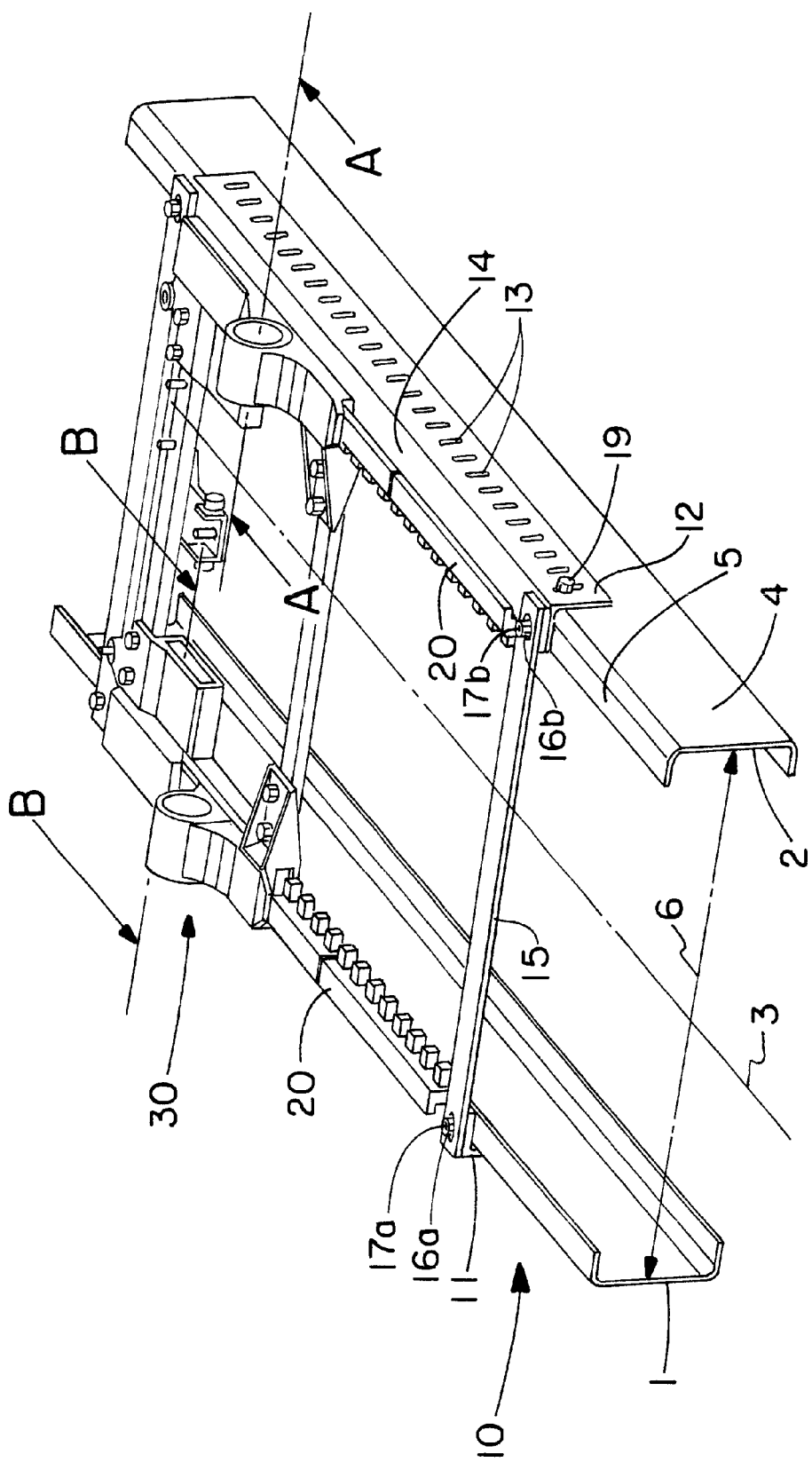
FIG. 1 A perspective representation of the frame of the semi-trailer truck with the sliding device arranged on it, FIG. 2 A view from above of the right side of the arrangement shown in FIG. 1 in a cutout view, FIGS. 3a, 3b and 3c A sectional view of each figure along Line III—III of the device shown in FIG. 1, and FIG. 4 A sectional view, as per another embodiment.

FIG. 1 shows a schematic representation of the frame construction of a semi-trailer truck, on which a sliding device is mounted. The frame construction of the semi-trailer truck consists of two vehicle frames 1 and 2, which comprise a C-shaped profile open toward the inside. The longitudinal direction to the vehicle is indicated by 3, which agrees with the longitudinal direction of the sliding device.

Fastened to this frame construction of the semi-trailer truck is a base frame 10, which comprises two angular profiles 11 and 12, which are linked to each other by means of tie-bars 15. Each of these tie-bars 15 has two longitudinal holes 16a, b, whose longitudinal axes extend longitudinally 6. The tie-bars 15 are fastened to both angular profiles 11 and 12 with fastening screws 17a, b. Both angular profiles 11, 12 are arranged on the vehicle frames 1 and 2 in such a manner that the vertical leg 13 lays on the outside 4 and the horizontal leg 14 on the top side 5 of each vehicle frame 1, 2. The angular profiles 11, 12 are fastened with screws 19. The tie-bars 15 also form the front and rear stops for the upper part 30.

Furthermore, on the upper part of the horizontal leg 14 a runner 20 is fastened, which is explained in detail in FIGS. 3a, b and c, as well as in FIG. 4. On this runner 20 the upper part 30 is arranged so it can be displaced both longitudinally 3 and transversally 6. To this end, the upper part 30 has inside and outside C-frames 32 and 31, respectively, on its underside, which are also further explained in connection with FIGS. 3a, b and c, as well as FIG. 4. The upper part 30 forms a movable slider on the base frame 10.

FIG. 2 shows the view from above onto one of the two vehicle frames, on which one of the two angular profiles 11 is fastened.

The tie-bar 15 is fastened to these angular profiles 11 with the fastening screw 17 a through the longitudinal hole 16.

Furthermore, the catch ledge 18 is visible, which is fastened to the runner (not shown) and which interacts with a blocking piece 24, to provide a corresponding framework that is fastened to the top part.

FIG. 3a shows a sectional view along Line III—III through the arrangement shown in FIG. 1, whereby the sectional view runs through the pedestal, onto which the fifth wheel (not shown) is fastened. The right vehicle frame 2 is shown in dashes. Fastened to this vehicle frame 2 is the angular profile 12, on which an upwardly projecting runner 20 is welded to the runner body 21, which has one leg 23 pointing inward and one leg 22 pointing outward. These legs 22 and 23 are vertically staggered relative to each other.

The upper part 30 has on its underside two C-frames 32 and 31, which grip under each respective leg 23 and 22. Between the legs 22 and the vertical section of the C-frame 31, as well as the between the leg 23 and the vertical section of the C-frame 32, gaps 40 and 41 are present, which make sliding possible in the transverse direction to the vehicle.

If, as shown in FIG. 3a, the frame construction of the semi-trailer truck roughly reflects the width of the upper part, then both gaps 41 and 40 will be around the same size.

If, however, as shown in FIG. 3b, the distance from the frames 1 and 2 is significantly less than the distance provided for the upper part 30, this can be evened out by reducing the gap 41 and increasing the gap 40, due to the slideability of the upper part 30 on the runner 20. Therefore, no reconstruction need be carried out either on the base frame or the upper part.

The upper part is secured to the base frame by means of the catch ledge 18 and the blocking piece 24 previously mentioned in connection with FIG. 2. In FIG. 3c, an embodiment is shown which uses an inside leg 23 as a catch ledge 18. Alternately, it is also possible to provide the outside leg 22 as a catch ledge. In this case the blocking piece 24 would have to be mounted on the C-frame 31.

FIG. 4 shows another embodiment, where the angular profile 12 is moved to the runner body 21 and the outside leg 22. This yields an S-shaped transverse section of the one-piece angular runner component, further simplifying manufacturing. The inside leg 23 is welded to the inside of the runner body 21. Otherwise, the arrangement reflects the arrangement shown in FIGS. 3a and 3b.

REFERENCE SIGNS

1 Left vehicle frame
2 Right vehicle frame
3 Vehicle longitudinal direction
4 Outside
5 Top side
6 Transverse direction
10 Base frame
11 Angular profile
12 Angular profile
13 Vertical leg
14 Horizontal leg
15 Tie-bar
16a, b Longitudinal hole
17a, b Fastening screw
18 Catch ledge
19 Fastening screw
20 Runner
21 Runner body
22 Outside leg
23 Inside leg
24 Blocking piece
30 Upper part
31 Outside C-frame
32 Inside C-frame
33 Pedestal
40 Gap
41 Gap

What is claimed is:

1. A sliding device for a fifth wheel comprising: an upper part bearing the fifth wheel and forming an adjustable unit, with a base frame arranged under the upper part, wherein,
the base frame has two angular profiles extending longitudinally, which are linked to each other by means of two detachable and slideable tie-bars, and
wherein each angular profile has initial retaining means, which interact with second retaining means of the upper part in such a way that the upper part can be displaced longitudinally and transversely relative to the base frame.

2. A device according to claim 1, wherein each of the retaining means comprises a runner arranged on the angular profile with a runner body projecting upward and with an inside leg and an outside leg, and that the second retaining means on the underside of the upper part comprise C-frames that enclose these legs.

3. A device according to claim 2, wherein the legs are vertically staggered relative to each other.

4. A device according to claim 2, wherein the inside leg or the outside leg forms a catch ledge.

5. A device according to claim 2, wherein the angular profile, the runner body and one leg forms a one-piece assembly.

6. A device according to claim 1, wherein the tie-bars have longitudinal holes.

7. A device according to claim 3, wherein the inside leg or the outside leg forms a catch ledge.

8. A device according to claim 4, wherein the angular profile, the runner body and one leg forms a one-piece assembly.

9. A device according to claim 5, wherein the tie-bars have longitudinal holes.

* * * * *